H. D. BRODIE.
VALVE FOR INTERNAL COMBUSTION ENGINES.
APPLICATION FILED MAY 8, 1913.

1,145,398.

Patented July 6, 1915.

UNITED STATES PATENT OFFICE.

HUGO DOUGLAS BRODIE, OF BIGGAR, SCOTLAND.

VALVE FOR INTERNAL-COMBUSTION ENGINES.

1,145,398. Specification of Letters Patent. Patented July 6, 1915.

Application filed May 8, 1913. Serial No. 766,409.

*To all whom it may concern:*

Be it known that I, HUGO DOUGLAS BRODIE, a subject of the King of the United Kingdom of Great Britain and Ireland, and resident of Southpark, Biggar, Scotland, gentleman, have invented certain new and useful Improvements in Valves for Internal-Combustion Engines, of which the following is a specification.

This invention relates to valves for internal combustion engines, and more particularly to rotary disk valves having a hollow space therein for the reception of cooling water.

We are aware that in connection with solid rotary disk valves it has been heretofore proposed to provide, on the valve spindle, a suitable spring for holding the valve against its seat and to provide between such spring and the stationary casing or cylinder an anti-friction ball-race.

Under the present invention, which has for its object to improve the construction of valves of the above type, the valve is made with a hollow space therein for cooling water, or for heating fluid for use in super-heating fuel, and a suitable spring on the valve spindle is adapted to hold the valve in engagement with its seat while a ball race is interposed between such spring and the stationary casing or cylinder of the engine.

In order that the invention may be clearly understood I have hereunto appended an explanatory drawing whereon I have shown by way of illustration or example one convenient mode of carrying out the invention.

Figure 1:
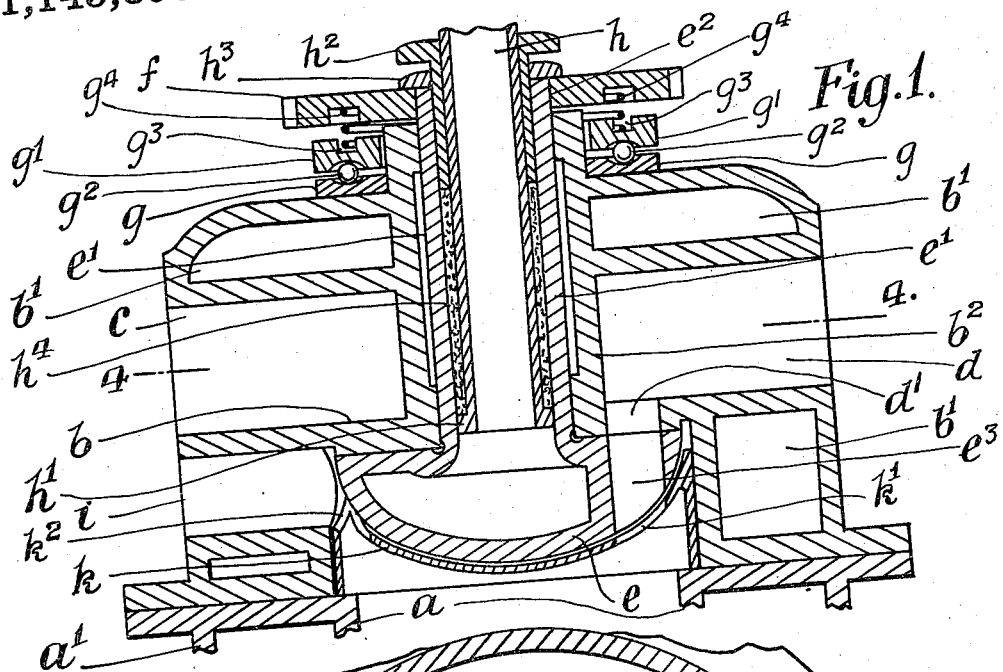
Figure 2:
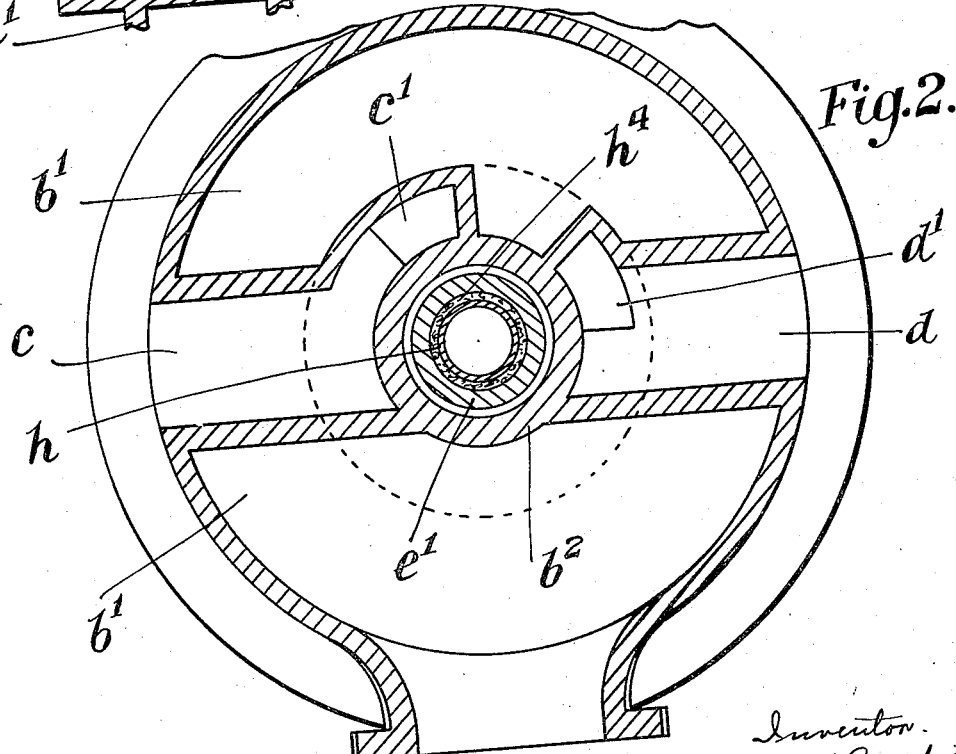

On the drawing above referred to Figure 1 is a vertical section of part of a single-cylinder internal combustion engine. Fig. 2 is a horizontal section taken on the line 4, 4, Fig. 1.

In the internal combustion engine, part of which is shown on the drawings, a cylinder $a$ is provided with a cooling jacket $a^1$ and the cylinder head $b$ has a water space $b^1$ for cooling the end of the cylinder. The cylinder head $b$ is made with passages $c$, $d$, for the admission and exhaust, these passages communicating by means of ports $c^1$, $d^1$, respectively with the cylinder (see Fig. 2). Adapted to work on the face of the cylinder end in such manner as to cover and uncover such parts as required is a valve $e$ (see Fig. 1) having a tubular stem or spindle $e^1$ which extends through a cylindrical or tubular portion $b^2$ in the cylinder head and is free to rotate therein. The outer end of this tubular stem $e^1$ is squared or made of hexagonal form at $e^2$ so as to receive a pinion or worm wheel $f$ similarly made for the reception of such end $e^2$. Located between this wheel $f$ and the cylinder head $b$ is a ball race consisting of a stationary ring $g$ and a rotary ring $g^1$ between which a series of balls $g^2$ are placed so as to run in grooves in such rings. The rotary ring $g^1$ is made with an annular recess or groove $g^3$ in which is arranged a spiral spring $g^4$ which bears also against the wheel $f$ so that the valve $e$ is held firmly against the face of the cylinder end by the action of such spring.

The valve $e$ is of mushroom shape and is made hollow so as to be capable of receiving cooling water. The valve is also made with a passage $e^3$ capable of registering with the ports $c^1$, $d^1$, so as to open the cylinder to supply and to exhaust. For supplying cooling water to the interior of the valve $e$, a pipe $h$ extends into the interior of the tubular stem $e^1$ and communicates also with a radiator or other water or fluid supply. The inner end of this pipe $h$ is made with a flange $h^1$, and at the outer end of the tubular stem $e^1$ a packing gland $h^2$ is provided, this gland being screwed into the outer end of the tubular stem $e^1$ in such manner that asbestos string or other like packing material $h^4$ may be tightly packed between the stem $e^1$ and the pipe $h$ so as to insure a water tight joint. The gland $h^2$ is secured by means of a locking nut $h^3$ which also serves to retain the wheel $f$ on the end of the tubular stem $e^1$.

Referring particularly to Fig. 1 of the drawings the sparking plug for the ignition of the charge is fitted in the opening $i$ at the head of the cylinder, and located between the valve and the piston is a guard $k$ adapted to prevent the valve falling into the cylinder in the event of the former breaking or working loose through any cause whatever. This guard $k$ which is secured in place in any suitable manner is arranged close up to the valve and has an opening $k^1$ in line with each of the openings $c^1$, $d^1$, in the end of the cylinder while another opening $k^2$ is provided to permit of the charge having free access to the sparking plug.

If desired the valve may, instead of being water cooled, be suitably heated by means of any convenient fluid so as to super-heat the fuel.

Claims:

1. A rotary valve for internal combustion engines comprising a valve casing constituting the cylinder end and having admission and exhaust ports, a spark plug opening and a central seat; a mushroom shaped valve with a hollow head and stem, said valve head being provided with a passage in axial direction for connecting the combustion chamber with one or the other of said ports when the valve is rotated; said valve stem extending axially through said casing and having a driving pinion secured to its free end, a packing gland around said stem, a spring around said stem acting between said pinion and said casing for pressing the valve head tight against its seat.

2. A rotary valve for internal combustion engines comprising a valve casing constituting the cylinder end and having admission and exhaust ports therein, a spark plug opening and a central seat; a mushroom shaped valve with a hollow head and stem, said valve head being provided with a passage in axial direction for connecting the combustion chamber with one or the other of said ports when the valve is rotated; said valve stem extending axially through said casing and having a driving pinion secured to its free end, a spring around said stem acting upon said pinion for pressing the valve head tight against its seat, a ball race around said stem and adjacent said spring for permitting easy running of said mushroom shaped valve and a loose ring interposed between such spring and ball race.

3. A rotary valve for internal combustion engines comprising a valve casing constituting the cylinder end and having admission and exhaust ports, a spark plug opening and a central seat; a mushroom shaped valve with a hollow head and stem, said valve head being provided with a passage in axial direction for connecting the combustion chamber with one or the other of said ports when the valve is rotated; said valve stem extending axially through said casing and having a driving pinion secured to its free end.

4. A rotary valve for internal combustion engines comprising a valve casing constituting the cylinder end and having admission and exhaust ports, a spark plug opening and a central seat; a mushroom shaped valve with a hollow head and stem, said valve head being provided with a passage in axial direction for connecting the combustion chamber with one or the other of said ports when the valve is rotated; said valve stem extending axially through said casing and having a driving pinion secured to its free end; a packing gland around said stem and a locking nut for securing the gland and the driving pinion in place, a guard conforming in shape to, and surrounding said head and secured in said casing, said guard having passages registering with said ports and said spark plug opening.

HUGO DOUGLAS BRODIE.

Witnesses:
JAMES AIKEN,
WILLIAM HAYNES.

Copies of this patent may be obtained for five cents each, by addressing the "Commissioner of Patents, Washington, D. C."